US008200988B2

(12) United States Patent
Gass et al.

(10) Patent No.: US 8,200,988 B2
(45) Date of Patent: Jun. 12, 2012

(54) FIRMWARE SECURITY KEY UPGRADE ALGORITHM

(75) Inventors: Larry H. Gass, Chandler, AZ (US); Chad W. Mercer, Chandler, AZ (US); David A. Schollmeyer, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 3635 days.

(21) Appl. No.: 09/922,041

(22) Filed: Aug. 3, 2001

(65) Prior Publication Data

US 2003/0028766 A1 Feb. 6, 2003

(51) Int. Cl.
*G06F 12/14* (2006.01)
*H04L 9/00* (2006.01)
(52) U.S. Cl. .................................. 713/193; 713/164
(58) Field of Classification Search ............. 713/2, 100, 713/200, 191, 187; 711/163; 380/273, 282, 380/285
See application file for complete search history.

(56) References Cited

U.S. PATENT DOCUMENTS

| | | | | |
|---|---|---|---|---|
| 5,748,940 A * | 5/1998 | Angelo et al. | ................. | 711/163 |
| 5,844,986 A * | 12/1998 | Davis | ............................. | 713/187 |
| 6,009,524 A * | 12/1999 | Olarig et al. | ................... | 713/200 |
| 6,094,702 A * | 7/2000 | Williams et al. | ............... | 711/101 |
| 6,145,085 A * | 11/2000 | Tran et al. | ....................... | 713/202 |
| 6,223,284 B1* | 4/2001 | Novoa et al. | .................... | 713/100 |
| 6,625,730 B1* | 9/2003 | Angelo et al. | ..................... | 713/2 |
| 6,711,675 B1* | 3/2004 | Spiegel et al. | .................... | 713/2 |
| 6,715,074 B1* | 3/2004 | Chaiken | ........................ | 713/164 |
| 6,834,264 B2* | 12/2004 | Lucas et al. | ..................... | 704/235 |
| 6,868,407 B1* | 3/2005 | Pierce | ............................. | 705/60 |
| 6,976,163 B1* | 12/2005 | Hind et al. | ...................... | 713/156 |
| 2001/0050990 A1* | 12/2001 | Sudia | ............................ | 380/286 |
| 2002/0108051 A1* | 8/2002 | Fougeroux et al. | ............ | 713/193 |
| 2002/0138592 A1* | 9/2002 | Toft | ............................... | 709/219 |
| 2002/0166061 A1* | 11/2002 | Falik et al. | ..................... | 713/200 |
| 2002/0169976 A1* | 11/2002 | Schelling et al. | ............. | 713/200 |
| 2004/0103347 A1* | 5/2004 | Sneed et al. | ..................... | 714/32 |
| 2004/0133794 A1* | 7/2004 | Kocher et al. | .................. | 713/193 |

* cited by examiner

*Primary Examiner* — Minh Dieu Nguyen
(74) *Attorney, Agent, or Firm* — Trop, Pruner & Hu, P.C.

(57) ABSTRACT

A portion of a firmware program may be automatically upgraded during power on of a processor-based system. A firmware upgrade file signed by a private key is authenticated using a public key accessible to the firmware program. The authentication and upgrade is performed automatically. Interrupted upgrades are anticipated and resolved by the firmware program. The public key is duplicated and is itself upgradable, in case the private key changes. The firmware program may be locked to prevent both viewing and unauthorized upgrades of the public keys or other parts of the firmware program.

9 Claims, 4 Drawing Sheets

FIRMWARE SECURITY KEY UPGRADE ALGORITHM

BACKGROUND

This invention relates to firmware for a processor-based system, and more particularly, to a secure mechanism for performing firmware upgrades.

A processor-based system typically includes firmware for initializing the system. Firmware is a software program that is permanently or semi-permanently resident in the processor-based system. Usually, the software program is "burned" into a read-only memory (ROM) or a flash memory device. The ROM or flash devices may be removable integrated circuits (ICs) that plug into a dedicated chip slot in the system board.

Although the device storing the firmware may be removable and, thus, physically replaced, more typically, the device is re-programmed in place, e.g., without physical removal. ROMs may be programmable (PROMs), erasable (EPROMs), and electrically erasable (EEPROMs). Flash memory is also programmable, and may typically be programmed at a faster rate than EEPROMs.

Like other software, the firmware itself is a valuable component of the processor-based system. Firmware is the very first code executed in the system. The firmware initializes the key hardware components. Once the system is initialized, the firmware typically loads an operating system program into memory, then executes the program.

The firmware comprises part of the identity of the processor-based system. Many computer manufacturers, for example, include a proprietary firmware that includes distinct features and capabilities that may distinguish the processor-based system from those of other manufacturers.

Occasionally, an upgrade to the firmware is desired. However, because the firmware is used to power on the system, firmware upgrades typically take into account the possibility of power failure during the upgrade. For example, many systems divide the firmware up such that only portions of the firmware may be upgraded. Under such protocol, assurance is made that, despite interruption in the firmware upgrade, a minimum amount of firmware is available to power on the system.

Although the programmability of the ROM/flash devices facilitates firmware upgrade, this capability also may adversely affect the security of the processor-based system. A software program running on the processor-based system, for example, may surreptitiously unlock and reprogram a flash device on the system, thereafter changing the operation of the system, or, worse yet, rendering the system unbootable. Nevertheless, the ability to upgrade and replace the firmware, such as during repairs, is desirable.

Thus, there is a continuing need to upgrade firmware without adversely affecting the system's security.

DETAILED DESCRIPTION

Figure 1:
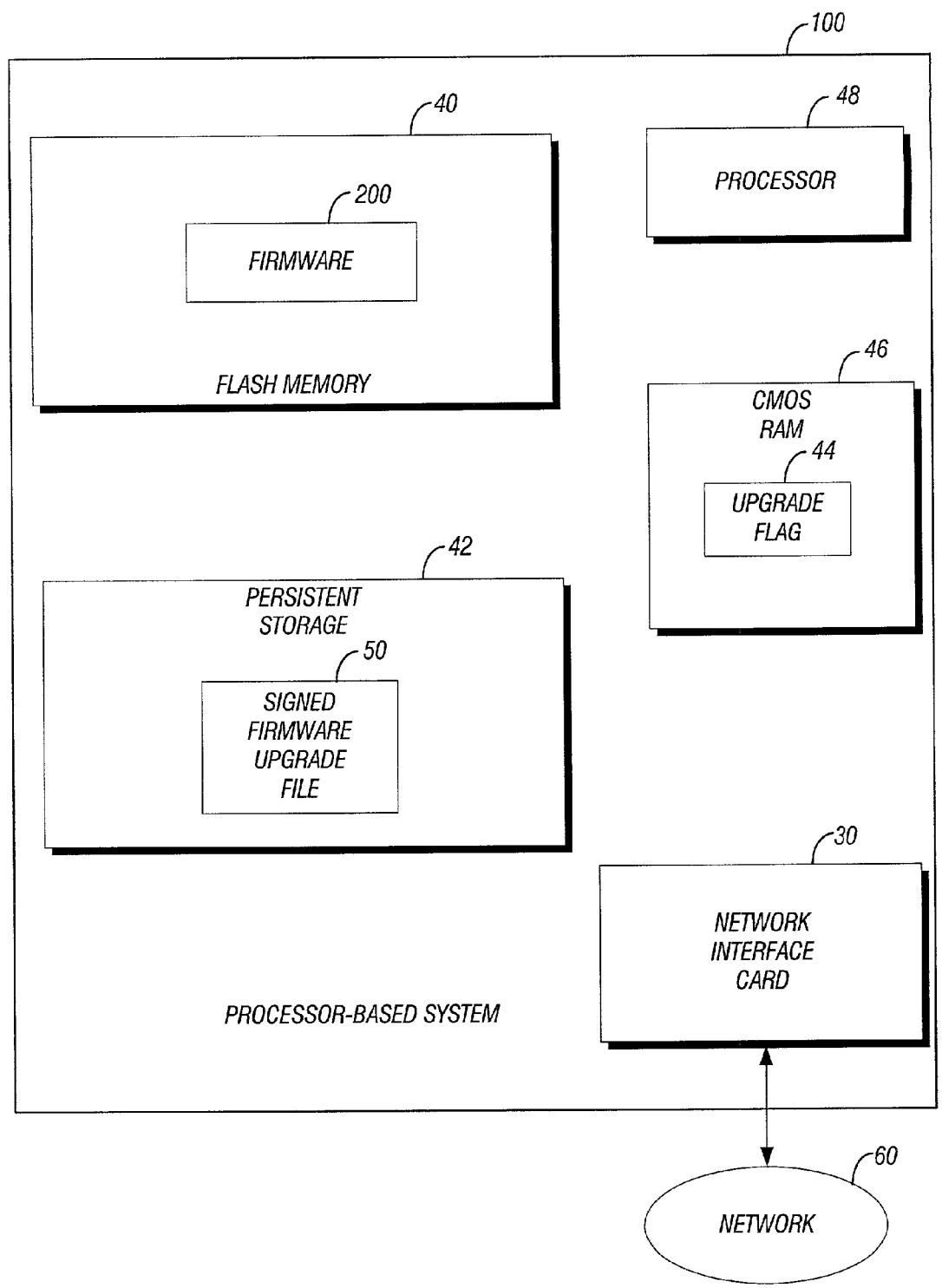
FIG. 1 is a block diagram of a processor-based system according to one embodiment of the invention.

According to one embodiment, as illustrated in FIG. 1, a system 100 may securely perform firmware upgrades, as described below. The system 100 includes firmware 200, residing on a flash memory 40. Alternatively, the system 100 may employ read-only memory (ROM) that is programmable, such as electrically erasable programmable read-only memory (EEPROM). The firmware 200 may essentially reside in any programmable, erasable medium that is non-volatile in its non-programmed state.

In one embodiment, the system 100 includes a processor 48, for executing the firmware 200 as well as other application programs and operating system software (not shown). The processor 48 may be any of a variety of processors such as the Pentium® processor, a product of Intel Corporation, of Santa Clara, Calif.

A persistent storage 42, such as a hard disk drive or compact disk (CD) ROM drive, stores a signed firmware upgrade file 50, according to one embodiment. The signed firmware upgrade file 50 includes data for upgrading portions of the firmware 200. The signed firmware upgrade file 50 originated from a firmware upgrade file that was "signed" by a private key held only by a "trusted source."

Designers of ordinary skill in the art of cryptography will recognize such a procedure as an initial measure for authenticating a file. The file to be protected is signed by a private key, where the private key is accessible typically only to a "trusted source." For example, the private key may be at a manufacturing site, used to sign files to be loaded on processor-based systems before shipment to customers. The customers never see the private key, only the signed file.

The signed file may then be authenticated by a public key. The availability of the public key is typically more widespread. In the example above, each processor-based system that is shipped to customers may include one or more public keys, which enable the customers to authenticate the signed file residing on the system.

The signed firmware upgrade file 50 may be downloaded to the persistent storage 42, such as from across a network 60. Accordingly, in one embodiment, the system 100 includes a network interface card 30, for coupling the system 100 to other processor-based systems (not shown) on the network 60.

In one embodiment, the system 100 further includes a complementary metal oxide semiconductor random access memory (CMOS RAM) 46. CMOS RAM 46 is a low-power semi-volatile storage device. The CMOS RAM 46 is nonvolatile (e.g., contents are retained following a power cycle) as long as a battery or other power source independent of the system power supply is connected to the CMOS RAM 46. The CMOS RAM 46 typically includes configuration information that the firmware 200 accesses during initialization.

In one embodiment, the CMOS RAM 46 includes an upgrade flag 44. The upgrade flag 44 may be set by a software program whenever an upgrade of the firmware 200 is desired. The firmware 200 checks the upgrade flag 44 during initialization and, when set, initiates a firmware upgrade procedure, according to the protocol described below. Upon completion of the upgrade procedure, the upgrade flag 44 is cleared.

Figure 2:
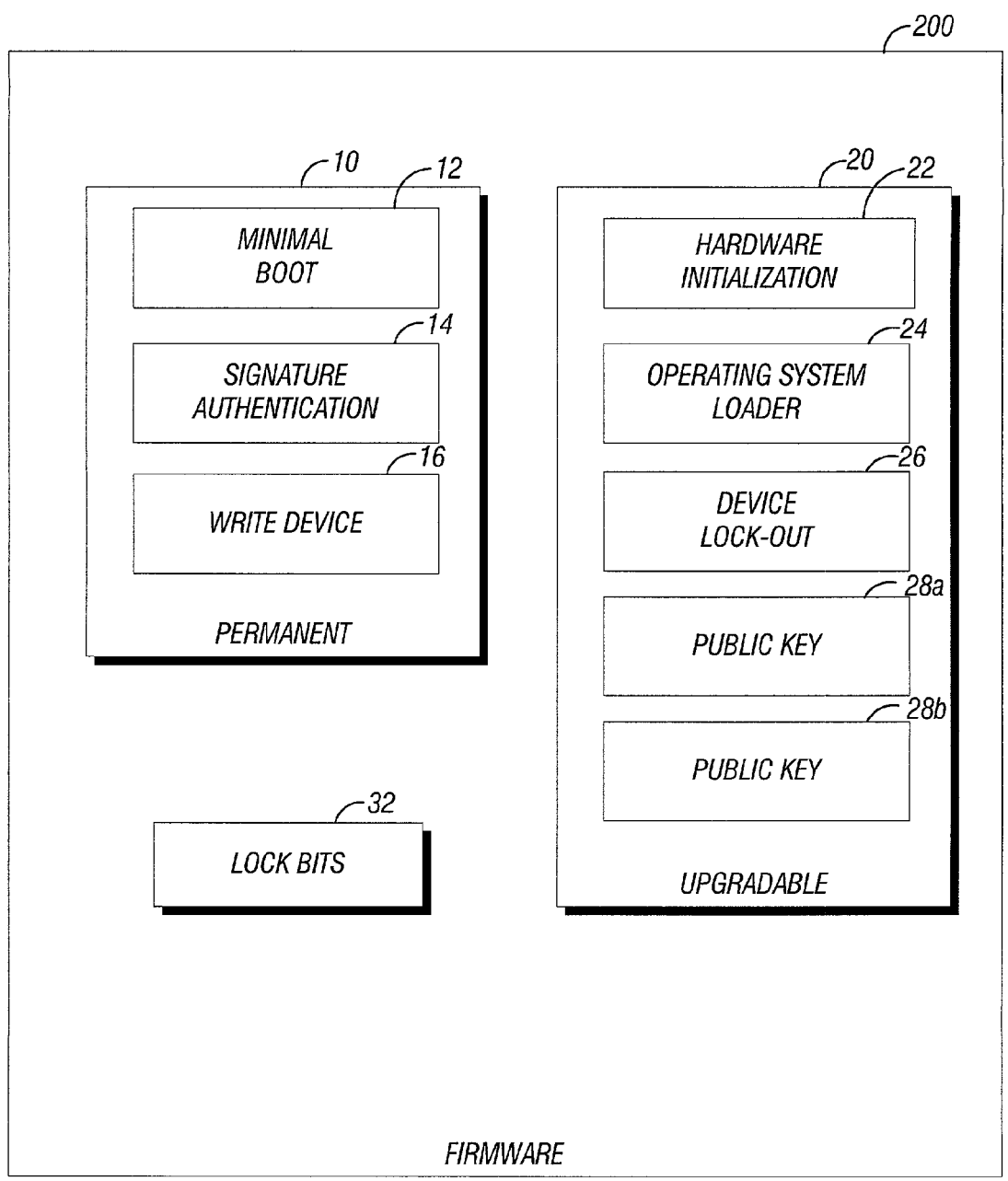
FIG. 2 is a block diagram of the firmware of the processor-based system of FIG. 1 according to one embodiment of the invention.

In one embodiment, the firmware 200 includes a permanent portion 10 and an upgradable portion 20, as shown in FIG. 2. The permanent portion 10 includes that portion of the firmware 200 that is not ever changed. Accordingly, software for minimally powering on the system, shown as a minimal boot portion 12, is part of the permanent portion 10 of the firmware 200. In one embodiment, the permanent portion 10 further includes a signature authentication portion 14 and a write device portion 16.

In one embodiment, the signature authentication portion 14 includes instructions used to confirm the validity of the firmware upgrade file 50, located in the persistent storage 42 of the system 100. The write device portion 16 includes instructions for reprogramming the upgradable portion 20 of the firmware 200, using the signed firmware upgrade file 50.

The minimal boot portion 12, signature authentication portion 14 and write device portion 16 of the firmware 200 are relatively permanent because, without them, the system 100 would not be able to power up or perform firmware upgrades. However, in one embodiment, other portions of the firmware 200 may be replaceable. As illustrated in FIG. 2, these replaceable or upgradable portions 20 include hardware initialization portion 22, operating system loader 24, device lock-out portion 26, public key 28a, and public key 28b.

In one embodiment, the hardware initialization portion 22 performs those power-on operations above and beyond what was performed during execution of the minimal boot portion 12 of the firmware 200. In some instances, it may be desirable to upgrade this hardware initialization portion 22. For example, when a new hardware device is to be supported by the system 100, an associated firmware upgrade may be appropriate.

Another upgradable element is the operating system loader 24. The operating system loader 24 is that portion of the firmware 200 that both loads and executes the operating system. Once the operating system has control of the system 100, e.g., known as runtime operation, the firmware 200 no longer executes. The operating system loader 24 is typically executed at the end of the firmware initialization.

In one embodiment, the device lock-out portion 26 is also upgradable. Upon execution, the device lock-out portion 26 accesses lock bits 32 that both preclude upgrade of the flash memory 40 and prevent reading of its contents, such as the firmware 200. This prevents access to the firmware 200 by unauthorized users as well as protecting the proprietary software of the manufacturer. Further, unauthorized access to the firmware 200 is prevented by the operating system and application software.

The upgradable portion 20 of the firmware 200 further includes two public keys 28a and 28b. In one embodiment, the public keys 28 are used to access the signed firmware upgrade file 50, located in the persistent storage 42. Two copies of the public key, public keys 28a and 28b, are supplied. This allows the public keys 28 themselves to be upgraded. Such an upgrade may be desirable when the private key is changed, for example.

When no change to the public keys 28 is desired, the public keys 28 are hidden from view by executing the device lock-out portion 26, in one embodiment. Once the flash 40 is locked, the public keys 28 are not readable or writable by any program.

In some prior art systems, during a firmware upgrade, assurance had to be made that no power interruption would occur during the upgrade itself. If a power interruption did occur, the firmware would essentially be corrupted and, thus, useless. (Often, a firmware program performs a checksum as a first step, prior to any system initialization. An interrupted firmware upgrade would cause the firmware to have an incorrect checksum.) Physical removal of the device from the system and replacement by an uncorrupted device was often the only option for resolving the corrupted firmware problem.

By having two identical public keys 28a and 28b, assurance that a power failure will not occur need not be made during an upgrade of the firmware 200. Instead, an interruption to the firmware upgrade may render one of the public keys 28a (28b) useless. Nevertheless, the other public key 28b (28a) is available during a subsequent upgrade attempt.

In one embodiment, during normal operation of the system 100, an application program may download the signed firmware upgrade file 50 into the persistent storage 42. The signed firmware upgrade file 50 may be downloaded to the system 100 from across the network 60, retrieved from a floppy device, or procured by other means. The application program may also set the upgrade flag 44, located in the CMOS RAM 46. The application program may further restart the system 100 such that the firmware 200 begins executing. The firmware 200 checks the upgrade flag 44 to detect if an upgrade of the firmware 200 is appropriate.

Where the upgrade flag 44 is set, according to one embodiment, the firmware 200 searches the persistent storage 42 for the new firmware upgrade file 50. Once detected, the firmware 200 reads the first copy of the public key 28a from the firmware 200. If, for any reason, the public key 28a is invalid, the firmware 200 reads the second copy of the public key 28b.

Once a valid public key 28 is found, the firmware 200 uses the public key 28 to verify the validity of the signed firmware upgrade file 50. In one embodiment, the signature authentication software 14 of the firmware 200 is used to verify the signature of the signed firmware upgrade file 50. If the signature is invalid, in one embodiment, the firmware 200 write-locks the flash memory 40 and ignores the upgrade request. The device lock-out program 26 may be executed, locking the flash memory 40 and, thus, preventing the firmware 200 from being upgraded.

If, however, the signature of the signed firmware upgrade file 50 is valid, the firmware 200 will rewrite, or upgrade, the upgradable portion 20 of the firmware 200. In one embodiment, the write device portion 16 of the firmware 200 performs the upgrade, using the signed firmware upgrade file 50. Once the upgrade of the firmware 200 is complete, the device lock-out routine 26 is executed, which locks the flash memory 40 and thus prevents further modification of the firmware 200.

In one embodiment, the flash memory 40 is divided into blocks and the upgrade of the firmware 200 is performed block by block. If a power failure occurs while the first public key 28a is partially written, for example, the valid second public key 28b, which was not rewritten, is still available for performing upgrades by the firmware 200.

If the power failure occurs while the second public key 28b is partially written, according to one embodiment, the first public key 28a will have already been rewritten. In either instance, a public key 28 is available for authenticating the signed firmware upgrade file 50.

Once all the upgradable portions 20 of the firmware 200 have been rewritten, the upgrade flag 44 is cleared by the firmware 200. Further, the signed firmware upgrade file 50 is erased from the persistent storage 42. Also following upgrade, according to one embodiment, the firmware 200 causes the system 100 to reboot. Since the upgrade flag 44 is no longer set, the system 100 will boot normally by executing the upgraded system firmware 200 and loading the operating system, as normal.

Figure 3:
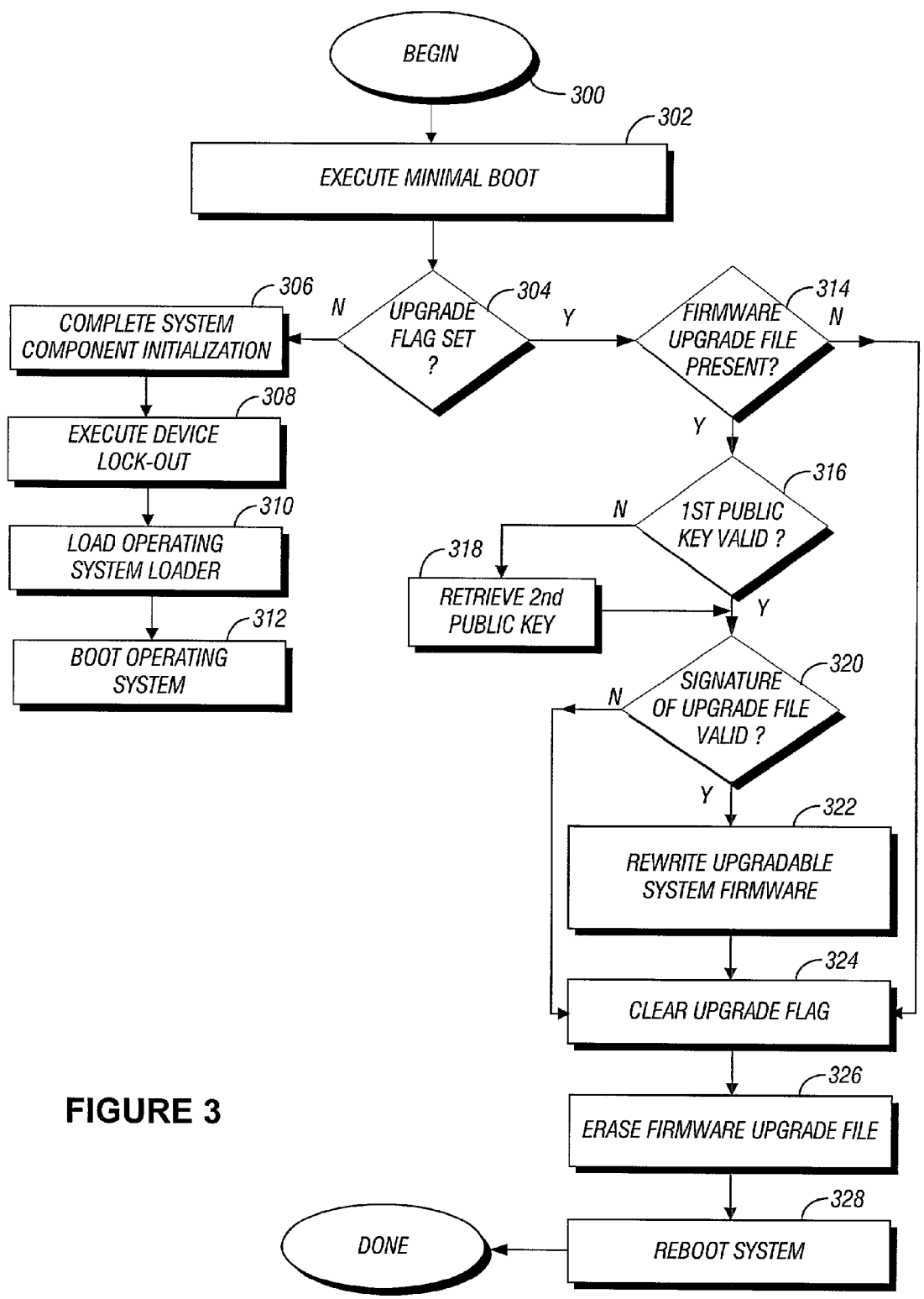
FIG. 3 is a flow diagram illustrating operation of the firmware of FIG. 2 according to one embodiment of the invention.

These operations are depicted in the flow diagram of FIG. 3, according to one embodiment. Upon receiving power by the system 100, the firmware 200 executes the minimal boot portion 12, part of the permanent portion of the firmware 200

(block 302). The operations performed during the minimal boot portion 12 may vary from system to system. In one embodiment, minimal boot includes initializing at least a portion of memory, initializing the video subsystem, and enabling a keyboard or other input device of the system 100.

In one embodiment following execution of the minimal boot portion 12, the firmware 200 reads the upgrade flag 44, located in the CMOS RAM 46 (diamond 304). Where the upgrade flag has not been set (the NO prong), no firmware upgrade is performed. Instead, the firmware 200 completes system component initialization that was not performed during the minimal boot sequence (block 306).

Next, the device lock-out portion 26 of the firmware 200 is executed (block 308). In one embodiment, the device lockout portion 26 sets the lock bits 32 such that the flash memory 40 is both not upgradable (write lock) and not viewable (read lock). The write lock prevents the firmware 200 from being upgraded, whether surreptitiously or unintentionally.

By also read-locking the firmware 200, the ability to decode the instructions contained therein is not possible. More importantly, in one embodiment, the public keys 28 may not be decoded. Where the firmware 200 includes proprietary software or software that is a trade secret, the read-lock feature may be preferred.

Once the firmware is secure, the firmware 200 loads the operating system loader (block 310), for execution. Accordingly, the operating system is booted (block 312).

Where, instead, the upgrade flag 44 is set, (the YES prong of diamond 304), the firmware 200 checks to see whether the signed firmware upgrade file 50 is present in the persistent storage 42 (diamond 314). If not, (the NO prong) no upgrade of the firmware 200 is possible. Instead, according to one embodiment, the upgrade flag 44 is cleared (block 324). When the system 100 is subsequently rebooted, an upgrade of the firmware 200 is not attempted because the upgrade flag 44 has been cleared.

Where the signed firmware upgrade file 50 is available (the YES prong of diamond 314), the firmware 200 retrieves the first public key 28a, from the firmware 200. The validity of the public key 28a is confirmed (diamond 316). The public key 28a may be validated in a number of ways known to those of skill in the art, including, but not limited to performing a checksum of the public key. If the public key 28a is deemed not valid (the NO prong), the second public key 28b is retrieved (block 318).

Where either the second public key 28b is retrieved or the first public key 28a is deemed valid (the YES prong of diamond 316), the signed firmware upgrade file 50 is authenticated using the public key 28 (diamond 320). Where the signed firmware upgrade 50 is not valid (the NO prong), no upgrade of the firmware 200 is performed. Instead, once again, the upgrade flag 44 is cleared (block 324) and the signed firmware upgrade file 50 is erased from the persistent storage 42 (block 326). As when no firmware upgrade file was present (diamond 314), this prevents the firmware 200 from attempting an upgrade on a subsequent boot of the system 100.

If, instead, the signed firmware upgrade file 50 is deemed valid by the signature authentication software 14, the upgradable portion 20 of the firmware 200 is rewritten at this time (block 322). The rewrite operation performed on the upgradable portion 20 of the firmware 200 is described in more detail in the flow diagram of FIG. 4, below.

Once the firmware upgrade has completed (or has been deemed not upgradable), the upgrade flag 44 is reset or cleared (block 324). Likewise, the signed firmware upgrade file 50 is erased from the persistent storage 42 (block 326).

Thus, the replacement of the upgradable portion 20 of the firmware 200 is complete, according to one embodiment. Following the firmware upgrade, the system 100 is rebooted (block 328).

According to one embodiment, the rewrite of the upgradable portion 20 of the firmware 200 may be performed by separating the firmware 200 into functional blocks, such as depicted in FIG. 2, above. In one embodiment, the upgrade operation is then performed by identifying a first upgradable block, upgrading the block, then proceeding to a subsequent upgradable block.

For example, the upgradable portion 20 of the firmware 200 may include a first block 40 including the hardware initialization portion 22, a second block including the operating system loader 24, a third block including the device lockout portion 26, a fourth block including the first public key 28a, and, finally, a fifth block including the second public key 28b.

In a second embodiment, the upgradable portion 20 of the firmware 200 is divided into blocks of equal sizes, each of which may be upgraded in turn. So, for example, the hardware initialization portion 22 may be divided into three blocks of equal sizes, each of which is upgraded in turn. The operating system loader 24 may comprise but a single block, and so on.

Figure 4:
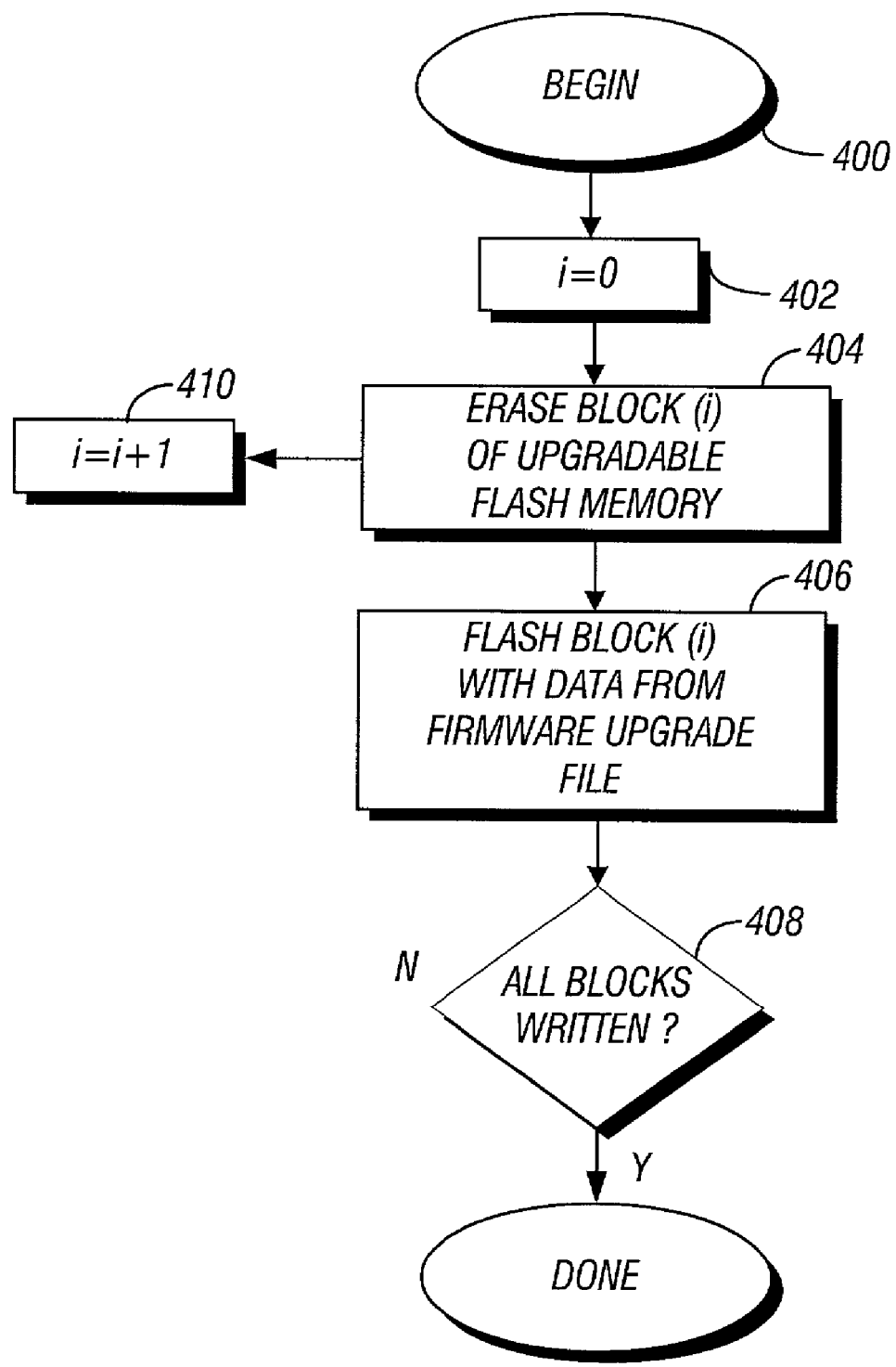
FIG. 4 is a flow diagram illustrating rewrite of the system firmware of FIG. 2 according to one embodiment of the invention.

In FIG. 4, a variable, i, denoting a block of the upgradable portion 20 of the firmware 200, is reset (block 402), such that the first (or $0^{th}$) block of the upgradable portion 20 is accessed. The $i^{th}$ block is then erased (block 404), using the write device software 16, located in the permanent portion 10 of the firmware 200. The write device software 16 receives data from the signed firmware upgrade file 50 and writes the data to the $i^{th}$ block of the flash memory 40 (block 406). Where all the blocks of the upgradable portion 20 have been written (diamond 408), the process is complete. Where additional blocks are to be written (the NO prong), the write device software 16 points to another block of the upgradable portion 20 (block 410). The subsequent block is then erased (block 404) so that new data may be written to the block (block 406). These operations are repeated until all upgradable blocks have been written.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   identifying a firmware upgrade request by a firmware program;
   retrieving a file signed with a private key;
   validating the file with a public key;
   upgrading a portion of the firmware program by the firmware program;
   locking a device storing the firmware program such that a second portion of the firmware program is not readable;
   validating the public key; and
   retrieving a second public key from the firmware program if the public key is not valid.

2. The method of claim 1, identifying a firmware upgrade request by a firmware program further comprising:
   reading a flag, wherein the flag is located in a non-volatile medium; and
   determining that the flag is set.

3. The method of claim 2, further comprising:
   deleting the file; and
   clearing the flag.

4. The method of claim 1, further comprising:
determining that the file is not authentic; and
locking the device.

5. The method of claim 1, further comprising:
locking the device after upgrading a portion of the firmware program by the firmware program.

6. The method of claim 1, wherein the second portion of the firmware program is a public key.

7. An article comprising a medium storing instructions for enabling a processor-based system to:
identify a firmware upgrade request by a firmware program;
retrieve a file signed with a private key;
validate the file with a public key;
upgrade a portion of the firmware program by the firmware program;
lock a device storing the firmware program such that the public key is not readable;
validate the public key; and
retrieve a second public key from the firmware program if the public key is not valid.

8. The article of claim 7, further storing instructions that enable the processor-based system to:
determine that the file is not authentic; and
lock the device.

9. A method comprising:
identifying a firmware upgrade request by a firmware program;
retrieving a file signed with a private key;
validating the file with a public key;
upgrading a portion of the firmware program by the firmware program;
locking a device storing the firmware program such that a second portion of the firmware program is not readable;
validating the public key;
retrieving a second public key from the firmware program if the public key is not valid;
reading a flag, wherein the flag is located in a non-volatile medium;
determining that the flag is set;
deleting the file; and
clearing the flag.

* * * * *